(12) United States Patent
Kim et al.

(10) Patent No.: US 12,265,426 B2
(45) Date of Patent: Apr. 1, 2025

(54) ELECTRONIC DEVICE INCLUDING SWEEPER

(71) Applicant: Samsung Electronics Co., Ltd., Suwon-si (KR)

(72) Inventors: Kiwoong Kim, Suwon-si (KR); Haekwon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 455 days.

(21) Appl. No.: 17/711,619

(22) Filed: Apr. 1, 2022

(65) Prior Publication Data

US 2022/0317739 A1 Oct. 6, 2022

Related U.S. Application Data

(63) Continuation of application No. PCT/KR2022/004675, filed on Apr. 1, 2022.

(30) Foreign Application Priority Data

Apr. 2, 2021 (KR) .................. 10-2021-0043487

(51) Int. Cl.
*H04M 1/02* (2006.01)
*G06F 1/16* (2006.01)

(52) U.S. Cl.
CPC .......... *G06F 1/1656* (2013.01); *G06F 1/1624* (2013.01); *G06F 1/1652* (2013.01);
(Continued)

(58) Field of Classification Search
CPC .. G06F 1/1615–1681; H04M 2201/38; H04M 1/0206–0269; H04M 1/17–18
See application file for complete search history.

(56) References Cited

U.S. PATENT DOCUMENTS

2010/0182738 A1 7/2010 Visser et al.
2016/0239050 A1 8/2016 Kim et al.
(Continued)

FOREIGN PATENT DOCUMENTS

CN 111508372 A 8/2020
CN 112233558 A * 1/2021
(Continued)

OTHER PUBLICATIONS

Translation of publication No. CN112233558A, printed on May 13, 2024, retrieved from Internet: <https://patents.google.com/patent/CN112233558A/en?oq=CN112233558> (Year: 2024).*

(Continued)

*Primary Examiner* — Ronald Eisner
(74) *Attorney, Agent, or Firm* — Jefferson IP Law, LLP

(57) ABSTRACT

According to various embodiments of the disclosure, an electronic device may comprise a first structure, a second structure receiving at least a portion of the first structure and guiding a sliding movement of the first structure, a flexible display including a first area connected with the first structure and a second area extending from the first area and bendable, and a sweeper member formed to slide along an inside of the second structure while being attached to an end of the second area of the flexible display, in response to the sliding movement of the flexible display.

20 Claims, 11 Drawing Sheets

(52) U.S. Cl.
CPC ........ *G06F 1/1681* (2013.01); *H04M 1/0237* (2013.01); *H04M 1/0268* (2013.01); *H04M 2201/38* (2013.01)

(56) References Cited

U.S. PATENT DOCUMENTS

| | | |
|---|---|---|
| 2017/0060183 A1* | 3/2017 | Zhang .................... H10K 59/87 |
| 2017/0222178 A1 | 8/2017 | Kang et al. |
| 2019/0268455 A1 | 8/2019 | Baek et al. |
| 2019/0296259 A1 | 9/2019 | Baek et al. |
| 2019/0305237 A1 | 10/2019 | Shin et al. |
| 2019/0317550 A1 | 10/2019 | Kim et al. |
| 2019/0384438 A1 | 12/2019 | Park et al. |
| 2022/0361347 A1 | 11/2022 | Feng |

FOREIGN PATENT DOCUMENTS

| | | |
|---|---|---|
| KR | 10-2010-0057531 A | 5/2010 |
| KR | 10-2016-0047100 A | 5/2016 |
| KR | 10-2016-0081786 A | 7/2016 |
| KR | 10-2016-0099998 A | 8/2016 |
| KR | 10-2017-0008610 A | 1/2017 |
| KR | 10-2019-0112535 A | 10/2019 |
| KR | 10-2019-0119719 A | 10/2019 |

OTHER PUBLICATIONS

International Search Report dated Jul. 13, 2022, issued in International Patent Application No. PCT/KR2022/004675.
European Search Report dated Jun. 12, 2024, issued in European Application No. 22781678.2.

* cited by examiner

ELECTRONIC DEVICE INCLUDING SWEEPER

CROSS-REFERENCE TO RELATED APPLICATION(S)

This application is a continuation application, claiming priority under § 365(c), of an International application No. PCT/KR2022/004675, filed on Apr. 1, 2022, which is based on and claims the benefit of a Korean patent application number 10-2021-0043487, filed on Apr. 2, 2021, in the Korean Intellectual Property Office, the disclosure of which is incorporated by reference herein in its entirety.

TECHNICAL FIELD

Various embodiments of the disclosure relate to an electronic device including a sweeper.

BACKGROUND ART

Advancing information communication and semiconductor technologies accelerate the spread and use of various electronic devices. In particular, recent electronic devices are being developed to carry out communication while carried on.

The term "electronic device" may mean a device performing a particular function according to its equipped program, such as a home appliance, an electronic scheduler, a portable multimedia player, a mobile communication terminal, a tablet PC, a video/sound device, a desktop PC or laptop computer, a navigation for automobile, etc. For example, electronic devices may output stored information as voices or images. As electronic devices are highly integrated, and high-speed, high-volume wireless communication becomes commonplace, an electronic device, such as a mobile communication terminal, is recently being equipped with various functions.

For example, an electronic device comes with the integrated functionality, including an entertainment function, such as playing video games, a multimedia function, such as replaying music/videos, a communication and security function for mobile banking, and a scheduling or e-wallet function. Such electronic devices become compact enough for users to carry in a convenient way.

As the demand for mobile communication increases, or as the degree of integration of electronic devices increases, the portability of electronic devices such as mobile communication terminals may be increased, and better convenience may be provided in use of multimedia functions. For example, as touchscreen-integrated displays replace traditional mechanical (button-type) keypads, electronic devices may come more compact while functioning as an input device. For example, as the mechanical keypad may be omitted from the electronic device, portability of the electronic device may be improved. As the display area may be expanded to the area which used to be occupied by the mechanical keypad, the electronic device may provide a larger screen while remaining in the same size and weight as when it has the mechanical keypad.

Use of an electronic device with a larger screen may give more convenience in, e.g., web browsing or multimedia playing. A larger display may be adopted to output a larger screen. However, this way may be limited by the portability of the electronic device. According to an embodiment, a display using organic light emitting diodes may secure the portability of the electronic device while providing a larger screen. For example, a display using, or equipped with, organic light emitting diodes may implement a stable operation even if it is made quite thin, so that the display may be applied to an electronic device in a foldable, bendable, or rollable form.

DISCLOSURE

Technical Problem

In an electronic device in which mechanical structures move relative to each other, the relative movement of the structures may be smoothed by securing a certain distance between the mechanical structures. However, the gap between the mechanical structures may be a passage through which foreign substances are introduced. Foreign substances introduced into the electronic device may cause damage to the mechanical structures (e.g., a hinge structure or a roller) that perform a folding operation or a rolling operation, and damage may be caused due to scratches or crushing of an electronic component, such as the display.

A foldable or rollable electronic device may include a flexible display. The flexible display may be attached to the mechanical structure. Since the flexible display is flexible enough to be folded or rolled, it may be damaged due to friction or interference with foreign substances.

According to various embodiments of the disclosure, there may be provided an electronic device capable of preventing damage to a mechanical structure and/or an electronic component, such as a display, by blocking or removing an inflow of external foreign substances.

According to various embodiments of the disclosure, there may be provided an electronic device including a flexible display, which may block entry of foreign substances while allowing the flexible display to be folded or rolled more smoothly.

Technical Solution

According to various embodiments of the disclosure, an electronic device may comprise a first structure, a second structure receiving at least a portion of the first structure and guiding a sliding movement of the first structure, a flexible display including a first area connected with the first structure and a second area extending from the first area and bendable, and a sweeper member formed to slide along an inside of the second structure while being attached to an end of the second area of the flexible display, in response to the sliding movement of the flexible display.

Advantageous Effects

According to various embodiments of the disclosure, the electronic device may provide a sweeper capable of removing foreign substances introduced into the inner space.

According to various embodiments of the disclosure, there may be provided an electronic device capable of preventing damage to a mechanical structure and/or an electronic component, such as a display, by blocking or removing an inflow of external foreign substances.

According to various embodiments of the disclosure, the electronic device may prevent scratches to the display or damage to the coating layer as the sweeper is attached to one end of the display to prevent the display from being rubbed due to the movement of the sweeper.

According to various embodiments of the disclosure, as the display slides, the electronic device may not only block an inflow of foreign substances but also discharge the introduced foreign substances to the outside.

Effects of the disclosure are not limited to the foregoing, and other unmentioned effects would be apparent to one of ordinary skill in the art from the following description.

DESCRIPTION OF THE DRAWINGS

The above and other aspects, features, and advantages of certain embodiments of the disclosure will be more apparent from the following description taken in conjunction with the accompanying drawings, in which.

MODE FOR INVENTION

Figure 1:
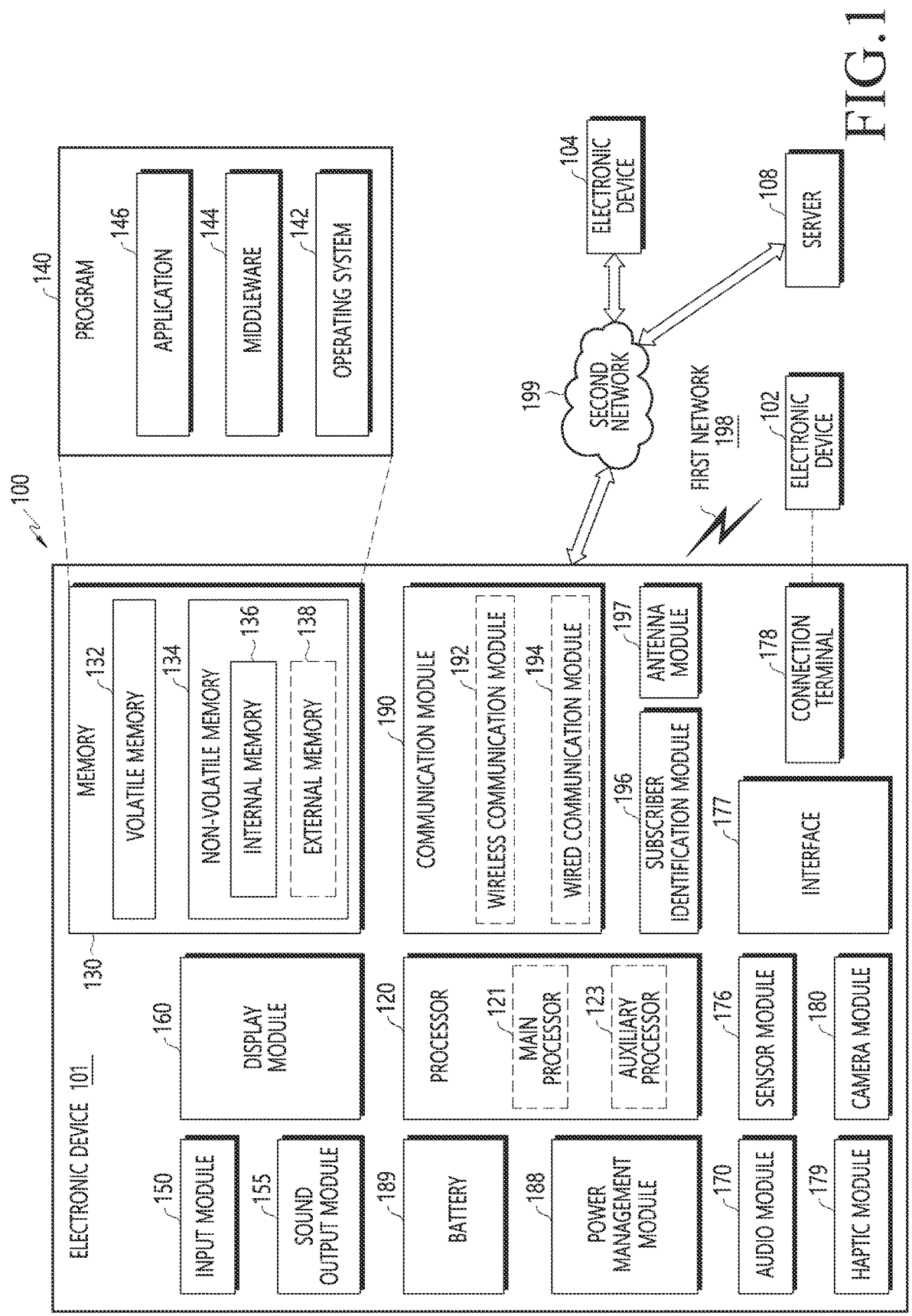
FIG. 1 is a block diagram illustrating an electronic device in a network environment according to various embodiments.

FIG. 1 is a block diagram illustrating an electronic device in a network environment according to various embodiments of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via a first network 198 (e.g., a short-range communication network, such as Bluetooth™ wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
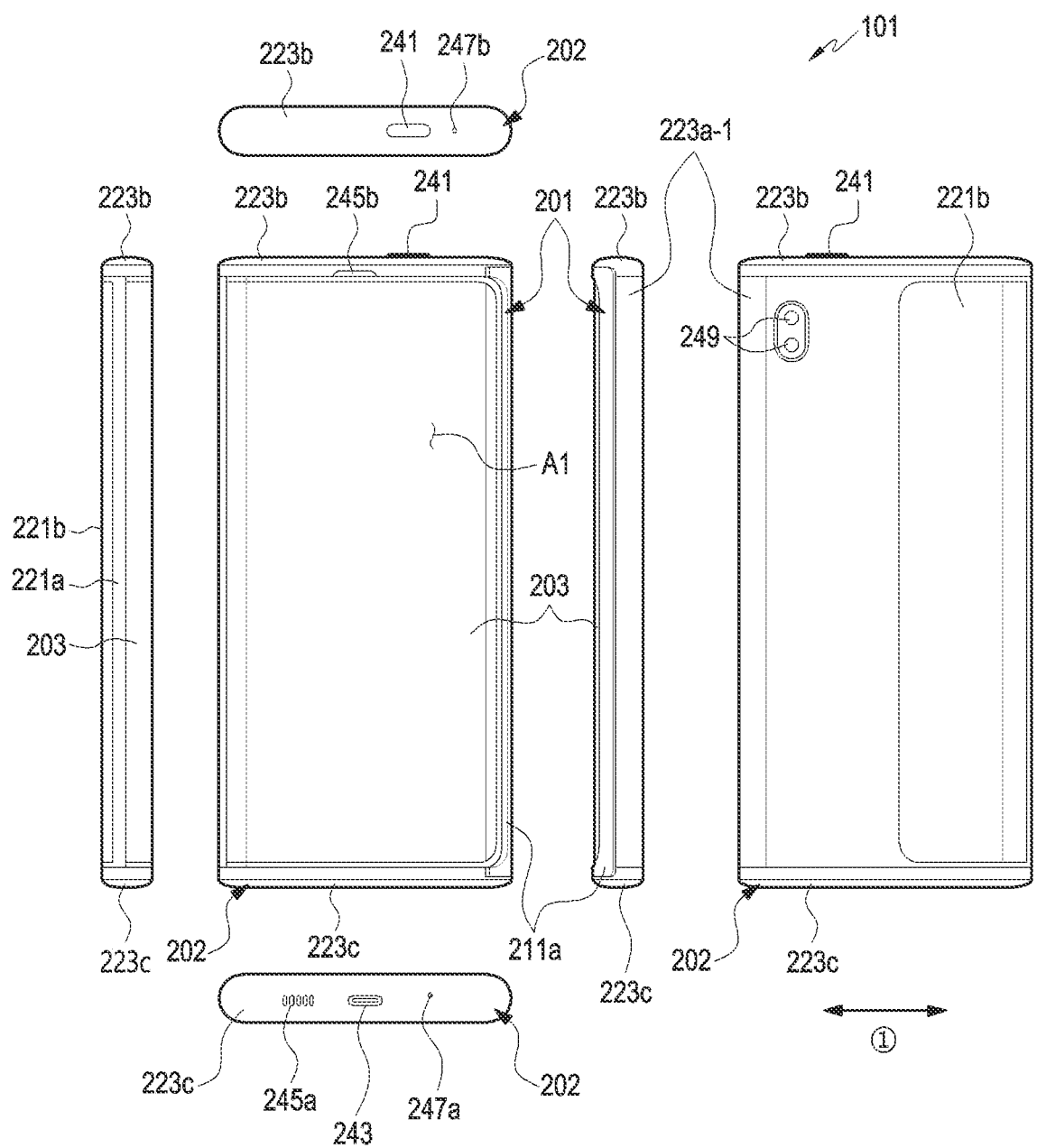
FIG. 2 is a view illustrating an electronic device according to various embodiments of the disclosure, wherein a portion of a flexible display is received in a second structure.
Figure 3:
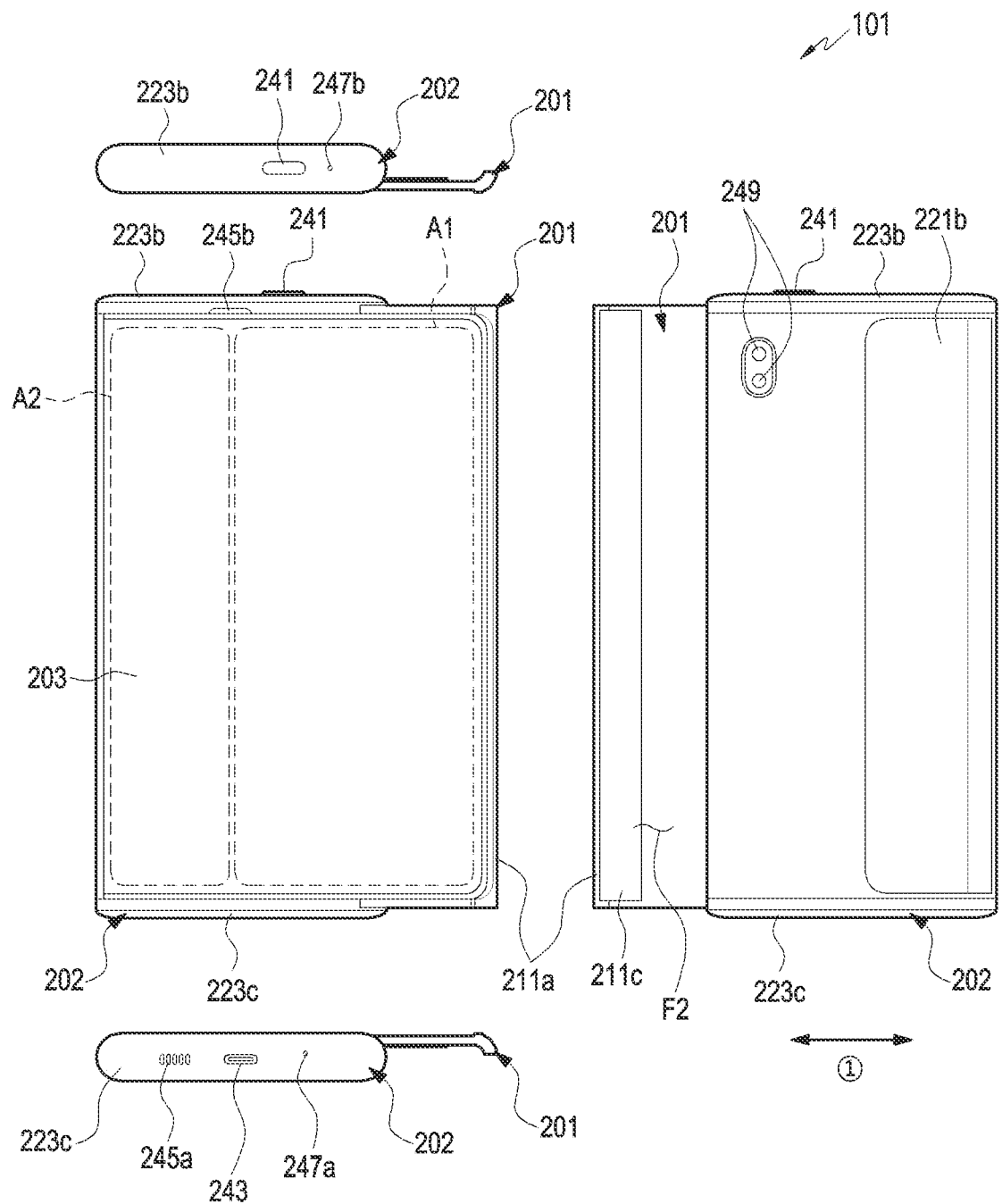
FIG. 3 is a view illustrating an electronic device according to various embodiments of the disclosure, wherein most of a flexible display is exposed to the outside of a second structure.

FIG. 2 is a view illustrating an electronic device 101 according to various embodiments of the disclosure, wherein a portion (e.g., a portion of a second area A2) of a flexible display 203 is received in a second structure 202. FIG. 3 is a view illustrating an electronic device 200 according to an embodiment, wherein most of a flexible display 203 (hereinafter, simply "display" 203) is exposed to the outside of a second structure 202.

The state shown in FIG. 2 may be defined as a first structure 201 being closed with respect to a second structure 202, and the state shown in FIG. 3 may be defined as the first structure 201 being open with respect to the second structure 202. According to an embodiment, the "closed state" or "open state" may be defined as a closed or open state of the electronic device.

Referring to FIGS. 2 and 3, an electronic device 101 may include a first structure 201 and a second structure 202 disposed to be movable in the first structure 201. According to an embodiment, the electronic device 101 may be interpreted as having a structure in which the first structure 201 is slidably disposed on the second structure 202. According to an embodiment, the first structure 201 may be disposed to perform reciprocating motion by a predetermined distance in a predetermined direction with respect to the second structure 202, for example, a direction indicated by an arrow ①).

According to an embodiment, the first structure 201 may be referred to as, for example, a first housing, a slide unit, or a slide housing, and may be disposed to reciprocate on the second structure 202. According to an embodiment, the second structure 202 may be referred to as, for example, a second housing, a main part, or a main housing, and may receive various electric or electronic components such as a main circuit board or a battery. A portion (e.g., the first area A1) of the display 203 may be seated on the first structure 201. According to an embodiment, another portion (e.g., the second area A2) of the display 203 may be received (e.g., slide-in) into the inside of the second structure 202 or exposed (e.g., slide-out) to the outside of the second structure 202 as the first structure 201 moves (e.g., slides) relative to the second structure 202.

According to various embodiments, the first structure 201 may include a first plate 211a (e.g., a slide plate) and may include a first surface F1 (refer to FIG. 4) formed with at least a portion of the first plate 211a and a second surface F2 facing in a direction opposite to the first surface F1. According to an embodiment, the second structure 202 may include a second plate 221a (refer to FIG. 4) (e.g., a rear case), a first sidewall 223a extending from the second plate 221a, a second sidewall 223b extending from the first sidewall 223a and the second plate 221a, a third sidewall 223c extending from the first sidewall 223a and the second plate 221a and parallel to the second sidewall 223b, and/or a rear plate 221b (e.g., a rear window). According to an embodiment, the second sidewall 223b and the third sidewall 223c may be formed to be perpendicular to the first sidewall 223a. According to an embodiment, the second plate 221a, the first sidewall 223a, the second sidewall 223b, and the third sidewall 223c may be formed to have an opening (e.g., in the front face) to receive (or surround) at least a portion of the first structure 201. For example, the first structure 201 may be coupled to the second structure 202 in a state in which it is at least partially surrounded, and the first structure 201 may be slide in a direction parallel to the first surface F1 or the second surface F2, for example, direction indicated with the arrow.

According to various embodiments, the second sidewall 223b or the third sidewall 223c may be omitted. According to an embodiment, the second plate 221a, the first sidewall 223a, the second sidewall 223b, and/or the third sidewall 223c may be formed as separate structures and may be combined or assembled. The rear plate 221b may be coupled to surround at least a portion of the second plate 221a. In some embodiments, the rear plate 221b may be formed substantially integrally with the second plate 221a. According to an embodiment, the second plate 221a or the rear plate 221b may cover at least a portion of the display 203. For example, the display 203 may be at least partially received inside the second structure 202, and the second plate 221a or the rear plate 221b may cover a portion of the display received inside the second structure 202.

According to an embodiment, the first structure 201 may be moved in an open state or closed state with respect to the second structure 202 in a first direction (e.g., direction ①) parallel with the second plate 221a (e.g., the rear case) and the second sidewall 223b to be positioned a first distance away from the first sidewall 223a in the closed state and be positioned a second distance away from the first sidewall 223a in the open state, wherein the second distance is larger than the first distance. In some embodiments, when in the closed state, the first structure 201 may be positioned to surround a portion of the first sidewall 223a.

According to various embodiments, the electronic device 101 may include a display 203, a key input device 241, a connector hole 243, audio modules 245a, 245b, 247a, and 247b, or a camera module 249. Although not shown, the electronic device 101 may further include an indicator (e.g., a light emitting diode (LED) device) or various sensor modules.

According to an embodiment, the display 203 may include the first area A1 and the second area A2. In one embodiment, the first area A1 may extend substantially across at least a portion of the first surface F1 and may be disposed on the first surface F1. The second area A2 may extend from the first area A1 and be inserted or received into the inside of the second structure 202 (e.g., housing) or be exposed to the outside of the structure 202 as the first structure 201 slides. As will be described below, the second area A2 may be moved while being substantially guided by a roller 251 (refer to FIG. 4) mounted on the second structure 202 and may thus be received into the inside of or exposed to the outside of the second structure 202. For example, while the first structure 201 slides, a portion of the second area A2 may be deformed into a curved shape in a position corresponding to the roller 251.

According to various embodiments, when viewed from the top of the first plate 211a (e.g., slide plate), when the first structure 201 moves from the closed state to the open state, the second area A2 may be gradually exposed to the outside of the second structure 202 to be substantially coplanar with the first area A1. The display 203 may be disposed to be coupled with, or adjacent to, a touch detecting circuit, a pressure sensor capable of measuring the strength (pressure) of touches, and/or a digitizer for detecting a magnetic field-type stylus pen. In one embodiment, the second area A2 may be at least partially received inside the second structure 202, and a portion of the second area A2 may be exposed to the outside even in the state shown in FIG. 2 (e.g., the closed state). In some embodiments, irrespective of the closed state or the open state, the exposed portion of the second area A2 may be positioned on the roller 251 and, in a position corresponding to the roller 251, a portion of the second area A2 may maintain the curved shape.

The key input device 241 may be disposed on the second sidewall 223b or the third sidewall 223c of the second structure 202. Depending on the appearance and the state of use, the electronic device 101 may be designed to omit the illustrated key input device 241 or to include additional key input device(s). According to an embodiment, the electronic device 101 may include a key input device (not shown), e.g., a home key button or a touchpad disposed around the home key button. According to an embodiment, at least a portion of the key input device 241 may be positioned on an area of the first structure 201.

According to various embodiments, the connector hole 243 may be omitted or may receive a connector (e.g., a universal serial bus (USB) connector) for transmitting and receiving power and/or data with an external electronic device. Although not shown, the electronic device 101 may include a plurality of connector holes 243, and some of the plurality of connector holes 243 may function as connector holes for transmitting/receiving audio signals with an external electronic device. In the illustrated embodiment, the connector hole 243 is disposed on the third sidewall 223c, but the present invention is not limited thereto. For example, the connector hole 243 or a connector hole not shown may be disposed on the first sidewall 223a or the second sidewall 223b.

According to various embodiments, the audio modules 245a, 245b, 247a, and 247b may include speaker holes 245a and 245b or microphone holes 247a and 247b. One of the speaker holes 245a and 245b may be provided as a receiver hole for voice calls, and the other may be provided as an external speaker hole. The microphone holes 247a and 247b may have a microphone inside to obtain external sounds. According to an embodiment, there may be a plurality of microphones to be able to detect the direction of a sound. In some embodiments, the speaker holes 245a and 245b and the microphone holes 247a and 247b may be implemented as one hole, or a speaker may be included without the speaker holes 245a and 245b (e.g., a piezo speaker). According to, the speaker hole indicated by the reference number "245b" may be disposed in the first structure 201 and used as a receiver hole for voice calls, and the speaker hole indicated by the reference number "245a" (e.g., an external speaker hole) or the microphone holes 247a and 247b may be disposed in the second structure 202 (e.g., one of the sidewalls 223a, 223b, and 223c).

The camera module 249 may be provided on the second structure 202 and may capture a subject in a direction opposite to the first area A1 of the display 203. The electronic device 101 may include a plurality of camera modules 249. For example, the electronic device 101 may include a wide-angle camera, a telephoto camera, or a close-up camera, and according to an embodiment, by including an infrared projector and/or an infrared receiver, the electronic device 101 may measure the distance to the subject. The camera module 249 may include one or more lenses, an image sensor, and/or an image signal processor. Although not shown, the electronic device 101 may further include a camera module (e.g., a front camera) that captures the subject in a direction opposite to the first area A1 of the display 203. For example, the front camera may be disposed around the first area A1 or in an area overlapping the display 203 and, when disposed in the area overlapping the display 203, the front camera may capture the subject via the display 203.

According to various embodiments, an indicator (not shown) of the electronic device 101 may be disposed on the first structure 201 or the second structure 202, and the indicator may include a light emitting diode to provide state information about the electronic device 101 as a visual signal. The sensor module (not shown) of the electronic device 101 may produce an electrical signal or data value corresponding to the internal operation state or external environment state of the electronic device. The sensor module may include, for example, a proximity sensor, a fingerprint sensor, or a biometric sensor (e.g., an iris/face recognition sensor or a heartrate monitor (HRM) sensor). According to another embodiment, the sensor module may further include, e.g., at least one of a gesture sensor, a gyro sensor, an atmospheric pressure sensor, a magnetic sensor, an acceleration sensor, a grip sensor, a color sensor, an infrared (IR) sensor, a temperature sensor, a humidity sensor, or an illuminance sensor.

Figure 4:
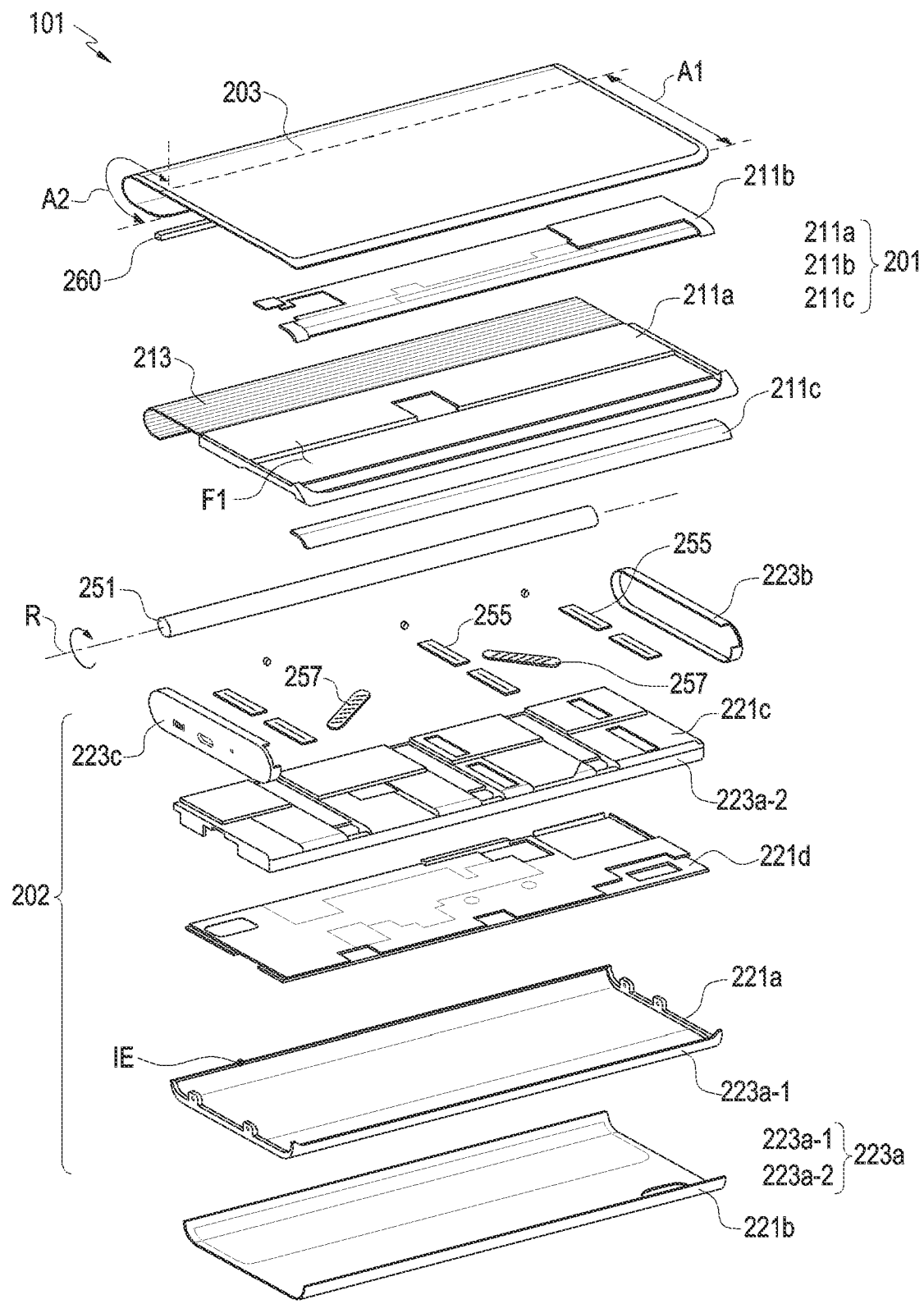
FIG. 4 is an exploded perspective view illustrating an electronic device according to various embodiments of the disclosure.

FIG. 4 is an exploded perspective view illustrating an electronic device (e.g., the electronic device 101 of FIGS. 2 and 3) according to various embodiments of the disclosure.

Referring to FIG. 4, the electronic device 101 may include a first structure 201, a second structure 202 (e.g., a housing), a flexible display 203 (hereinafter, simply "display" 203), a guide member (e.g., the roller 251), and/or an articulated hinge structure 213. A portion (e.g., the second area A2) of the display 203 may be received in the second structure 202 while being guided by the roller 251.

According to various embodiments, the first structure 201 may include a first plate 211a (e.g., a slide plate), a first bracket 211b and/or a second bracket 211c mounted on the first plate 211a. The first structure 201, for example, the first plate 211a, the first bracket 211b, and/or the second bracket 211c may be formed of a metallic material and/or a non-metallic (e.g., polymer) material. The first plate 211a may be mounted on the second structure 202 (e.g., the housing) and may be linearly reciprocated in one direction (e.g., in the direction ① indicated with the arrow in FIG. 2) while being guided by the second structure 202. In an embodiment, the first bracket 211b may be coupled with the first plate 211a, which together with the first plate 211a, form the first surface F1 of the first structure 201. The first area A1 of the display 203 may be substantially mounted on the first surface F1 and remain in a flat plate shape. The second bracket 211c may be coupled to the first plate 211a, which together with the first plate 211a, form the second surface F2 of the first structure 201. According to an embodiment, the first bracket 211b and/or the second bracket 211c may be integrally formed with the first plate 211a. This may be appropriately designed in consideration of the assembly structure or manufacturing process of the product to be manufactured. The first structure 201 or the first plate 211a may be coupled with the second structure 202 and slide with respect to the second structure 202.

According to various embodiments, the articulated hinge structure 213 may include a plurality of bars or rods 214 and may be connected to one end of the first structure 201. For example, as the first structure 201 slides, the articulated hinge structure 213 may move with respect to the second structure 202 and, in a closed state (e.g., the state shown in FIG. 2), the articulated hinge structure 213 may be substantially received inside the second structure 202. In some embodiments, even in the closed state, a portion of the articulated hinge structure 213 may not be received inside the second structure 202. For example, even in the closed state, a portion of the articulated hinge structure 213 may be positioned to correspond to the roller 251 outside the second structure 202. The plurality of rods 214 may extend in a straight line and be disposed parallel to the rotational axis R of the roller 251, and the plurality of rods 114 may be arranged along a direction perpendicular to the rotational axis R, e.g., the direction along which the first structure 201 slides.

According to various embodiments, each rod 214 may pivot around another adjacent rod 214 while remaining parallel with the other adjacent rod 214. Accordingly, as the first structure 201 slides, the plurality of rods 214 may be arranged to form a curved shape or a planar shape. For example, as the first structure 201 slides, a portion of the articulated hinge structure 213, which faces the roller 251, may form a curved surface, and another portion of the articulated hinge structure 213, which does not face the roller 251, may form a flat surface. In one embodiment, the second area A2 of the display 203 may be mounted or supported on the articulated hinge structure 213 and, in the open state (e.g., the state shown in FIG. 3), the second area A2, along with the first area A1, may be exposed to the outside of the second structure 202. In the state in which the second area A2 is exposed to the outside of the second structure 202, the articulated hinge structure 213 may substantially form a flat surface, thereby supporting or maintaining the second area A2 in the flat state.

According to various embodiments, the second structure 202 (e.g., the housing) may include a second plate 221a (e.g., the rear case), a printed circuit board (not shown), a rear plate 221b, a third plate 221c (e.g., the front case), and a supporting member 221d. The second plate 221a, e.g., the rear case, may be disposed to face in a direction opposite to the first surface F1 of the first plate 211a, and the second plate 121a may substantially form the external shape of the second structure 202 or the electronic device 101. In one embodiment, the second structure 202 may include a first sidewall 223a extending from the second plate 221a, a second sidewall 223b extending from the second plate 221a and formed to be substantially perpendicular to the first sidewall 223a, and a third sidewall 223c extending from the second plate 221a, substantially perpendicular to the first sidewall 223a, and parallel to the second sidewall 223b. In the illustrated embodiment, the second sidewall 223b and the third sidewall 123c are manufactured as separate components from the second plate 221a and are mounted or assembled on the second plate 221a. However, the second sidewall 223b and the third sidewall 223c may alternatively be integrally formed with the second plate 221a. The second structure 202 may receive an antenna for proximity wireless communication, an antenna for wireless charging, or an antenna for magnetic secure transmission (MST) in a space that does not overlap the articulated hinge structure 213.

According to various embodiments, the rear plate 221b may be coupled to the outer surface of the second plate 221a and, according to an embodiment, the rear plate 221b may be manufactured integrally with the second plate 221a. In one embodiment, the second plate 221a may be formed of a metal or polymer, and the rear plate 221b may be formed of a material such as metal, glass, synthetic resin, or ceramic to decorate the exterior of the electronic device 101. According to an embodiment, the second plate 221a and/or the rear plate 221b may be formed of a material that transmits light at least partially (e.g., an auxiliary display area). For example, while a portion (e.g., the second area A2) of the display 203 is received in the second structure 202, the electronic device 101 may output visual information using a partial area of the display 203 received inside the second structure 202. The auxiliary display area may provide the visual information output from the area received inside the second structure 202 to the outside of the second structure 202.

According to various embodiments, the third plate 221c may be formed of a metal or polymer, and the third plate 221c may be coupled with the second plate 221a (e.g., rear case), the first sidewall 223a, the second sidewall 223b, and/or the third sidewall 223c to form an internal space of the second structure 202. According to an embodiment, the third plate 221c may be referred to as a "front case", and the first structure 201, e.g., the first plate 211a, may be slid while substantially facing the third plate 221c. In some embodiments, the first sidewall 223a may be formed of a combination of a first sidewall portion 223a-1 extending from the second plate 221a and a second sidewall portion 223a-2 formed at an edge of the third plate 221c. According to another embodiment, the first sidewall portion 223a-1 may be coupled to surround an edge of the third plate 221c, e.g., the second sidewall portion 223a-2. In this case, the first sidewall portion 223a-1 itself may form the first sidewall 223a.

According to various embodiments, the supporting member 221d may be disposed in a space between the second plate 221a and the third plate 221c, and may have a flat plate shape formed of a metal or polymer. The supporting member 221d may provide an electromagnetic shielding structure in the internal space of the second structure 202 or may increase mechanical rigidity of the second structure 202. In one embodiment, when received into the inside of the second structure 202, a partial area (e.g., the second area A2) of the articulated hinge structure 213 and/or the display 203 may be positioned in a space between the second plate 221a and the supporting member 221d.

According to various embodiments, a printed circuit board (not shown) may be disposed in a space between the third plate 221c and the supporting member 221d. For example, the printed circuit board may be received in a space separated by the supporting member 221d from the space in which a partial area of the articulated hinge structure 213 and/or the display 203 is received inside the second structure 202. A processor, memory, and/or interface may be mounted on the printed circuit board. The processor may include one or more of, e.g., a central processing unit, an application processor, a graphic processing device, an image signal processing, a sensor hub processor, or a communication processor.

The memory may include, e.g., a volatile or non-volatile memory.

The interface may include, e.g., a high definition multimedia interface (HDMI), a universal serial bus (USB) interface, a secure digital (SD) card interface, and/or an audio interface. The interface may electrically or physically connect, e.g., the electronic device 101 with an external electronic device and may include a USB connector, an SD card/multimedia card (MMC) connector, or an audio connector.

According to various embodiments, the display 203 may be an organic light emitting diode-based flexible display, and the display 103 may normally remain in the flat shape and may be at least partially deformed into a curved shape. In one embodiment, the first area A1 of the display 203 may be mounted or attached to the first surface F1 of the first structure 201 and maintained in a substantially flat shape. The second area A2 may extend from the first area A1 and may be supported or attached to the articulated hinge structure 213. For example, the second area A2 may extend along the sliding direction of the first structure 201 and, along with the articulated hinge structure, may be received in the second structure 202. As the articulated hinge structure 213 is deformed, the second area A2 may be at least partially deformed into a curved shape.

According to various embodiments, as the first structure 201 slides on the second structure 202, the area of the display 203 exposed to the outside may vary. The electronic device 101 (e.g., processor) may change the area of the display 203 that is activated based on the area of the display 203 that is exposed to the outside. For example, in the open state or in an intermediate position between the closed state and the open state, the electronic device 101 may activate a partial area exposed to the outside of the second structure 202 of the entire area of the display 203. In the closed state, the electronic device 101 may activate the first area A1 of the display 203 and deactivate the second area A2. In the closed state, when there is no user input for a certain period of time (e.g., 30 seconds or 2 minutes), the electronic device 101 may deactivate the entire area of the display 203. In some embodiments, in the state in which the entire area of the display 203 is deactivated, the electronic device 101 may activate a partial area of the display 203 as necessary (e.g., a notification according to user settings, missing call/received message notification) and provide visual information through the auxiliary display area (e.g., a portion of the second plate 221a and/or the rear plate 221b formed of a material that transmits light).

According to various embodiments, in the open state (e.g., the state shown in FIG. 3), the entire area (e.g., the first area A1 and the second area A2) of the display 203 may be substantially exposed to the outside, and the first area A1 and the second area A2 may be arranged to form a plane. In one embodiment, even in the open state, a portion (e.g., one end) of the second area A2 may be positioned corresponding to the roller 251, and the portion of the second area A2, which corresponds to the roller 251 may remain in the curved shape. For example, according to an embodiment, despite the phrase "the second area A2 is disposed to form a plane in the open state," a portion of the second area A2 may remain in the curved shape. Likewise, although it is stated that "in the closed state, the articulated hinge structure 213 and/or the second area A2 are received inside the second structure 202," a portion of the second area A2 of the articulated hinge structure 213 may be positioned outside the second structure 202.

According to an embodiment, the guide member, e.g., the roller 251, may be rotatably mounted on the second structure 202 in a position adjacent to an edge of the second structure 202 (e.g., the second plate 221a). For example, the roller 251 may be disposed adjacent to an edge (e.g., the portion indicated with reference denotation 'IE') of the second plate 221a parallel to the first sidewall 223a. Although no reference denotation is assigned in the drawings, another sidewall may extend from the edge of the second plate 221a, and the sidewall adjacent to the roller 251 may be substantially parallel to the first sidewall 223a. As mentioned above, the sidewall of the second structure 202 adjacent to the roller 251 may be formed of a material that transmits light, and a portion of the second area A2 may provide visual information via the portion of the second structure 202 while being received in the second structure 202.

According to various embodiments, an end of the roller 251 may be rotatably coupled to the second sidewall 223b, and the other end thereof may be rotatably coupled to the third sidewall 223c. For example, the roller 251 may be mounted on the second structure 202, rotating about the rotation axis R perpendicular to the sliding direction (e.g., direction ① indicated with the arrow in FIG. 2 or 3) of the first structure 201. The rotation axis R may be disposed substantially parallel to the first sidewall 223a, and may be positioned away from the first sidewall 223a, for example, at one edge of the second plate 221a. In one embodiment, the gap formed between the outer circumferential surface of the roller 251 and the inner surface of the edge of the second plate 221a may form an entrance through which the articulated hinge structure 213 or display 203 enters the second structure 202.

According to various embodiments, when the display 203 is deformed into a curved shape, the roller 251 maintains a radius of curvature of the display 203 to a certain degree, thereby suppressing excessive deformation of the display 203. The term "excessive deformation" may mean that the display 203 is deformed to have a radius of curvature that is too small to damage pixels or signal lines included in the display 203. For example, the display 203 may be moved or deformed while being guided by the roller 251 and may be protected from damage due to excessive deformation. In some embodiments, the roller 251 may rotate while the articulated hinge structure 213 or the display 203 is inserted into or extracted from the second structure 202. For example, the friction between the articulated hinge structure 213 (or display 203) and the second structure 202 may be suppressed, allowing the articulated hinge structure 213 (or display 203) to smooth the insertion/extraction of the second structure 202.

According to various embodiments, the electronic device 101 may further include a guide rail(s) 255 and/or an actuating member(s) 257. The guide rail(s) 255 may be mounted on the second structure 202, e.g., the third plate 221c to guide a sliding of the first structure 201 (e.g., the first plate 211a or the slide plate). The actuating member(s) 257 may include a spring or a spring module that provides an elastic force in a direction to allow both ends thereof to move away from each other. An end of the actuating member(s) 257 may be rotatably supported by the second structure 202, and the other end may be rotatably supported by the first structure 201. When the first structure 201 slides, both the ends of the actuating member(s) 257 may be positioned closest to each other (hereinafter, a 'nearest point') at any one point between the closed state and the open state. For example, in the interval between the nearest point and the closed state, the actuating member(s) 257 may provide an elastic force to the first structure 201 in a direction moving toward the closed state and, in the interval between the nearest point and the open state, the actuating member(s) 257 may provide an elastic force to the first structure 201 in a direction moving toward the open state.

In the following description, the components easy to understand from the description of the above embodiments are denoted with or without the same reference numerals and their detailed description may be skipped. According to an embodiment, an electronic device (e.g., the electronic device 101 of FIGS. 2 to 4) may be implemented by selectively combining configurations of different embodiments, and the configuration of one embodiment may be replaced by the configuration of another embodiment. However, it is noted that the disclosure is not limited to a specific drawing or embodiment.

Figure 5:
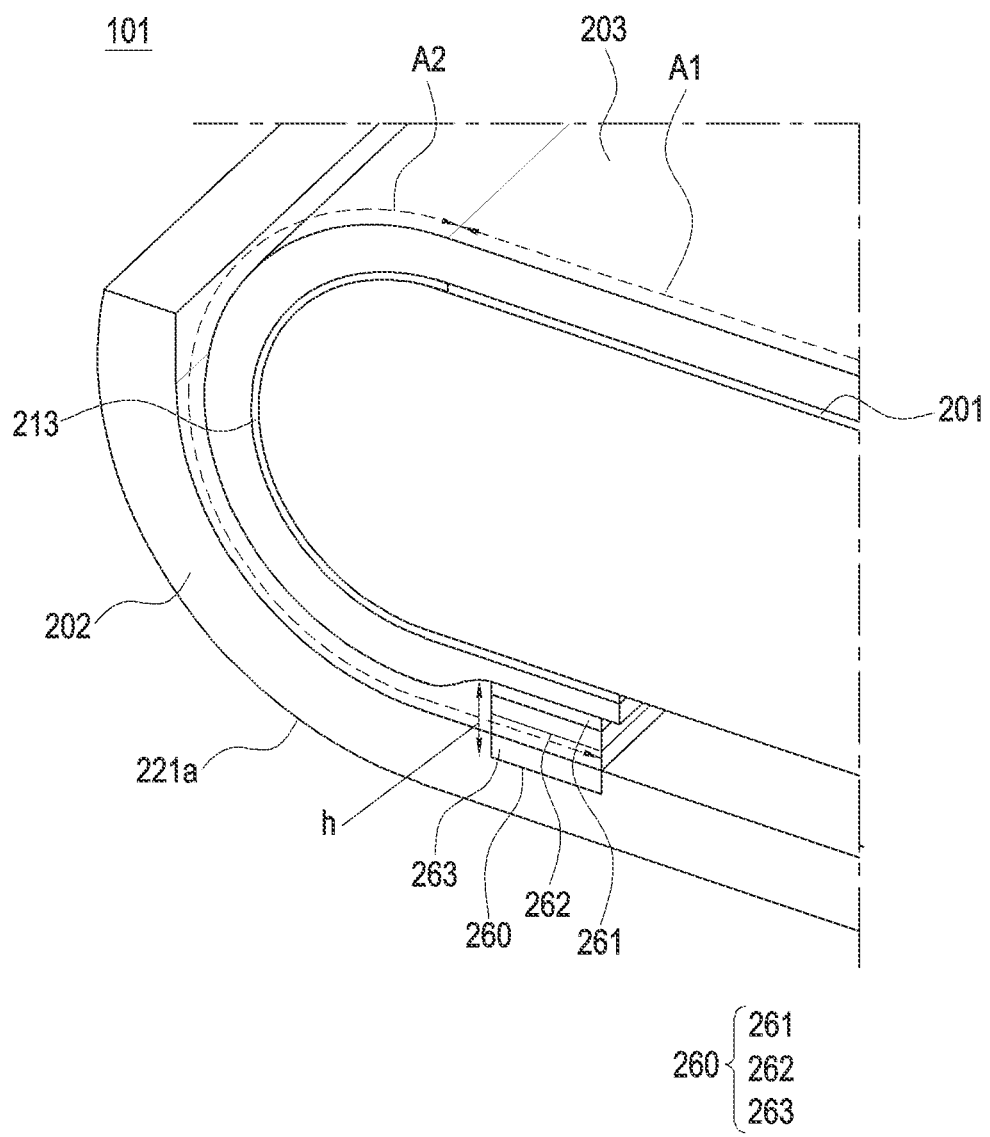
FIG. 5 is a perspective view illustrating an arrangement relationship between a sweeper and a surrounding structure according to various embodiments of the disclosure.
Figure 6:
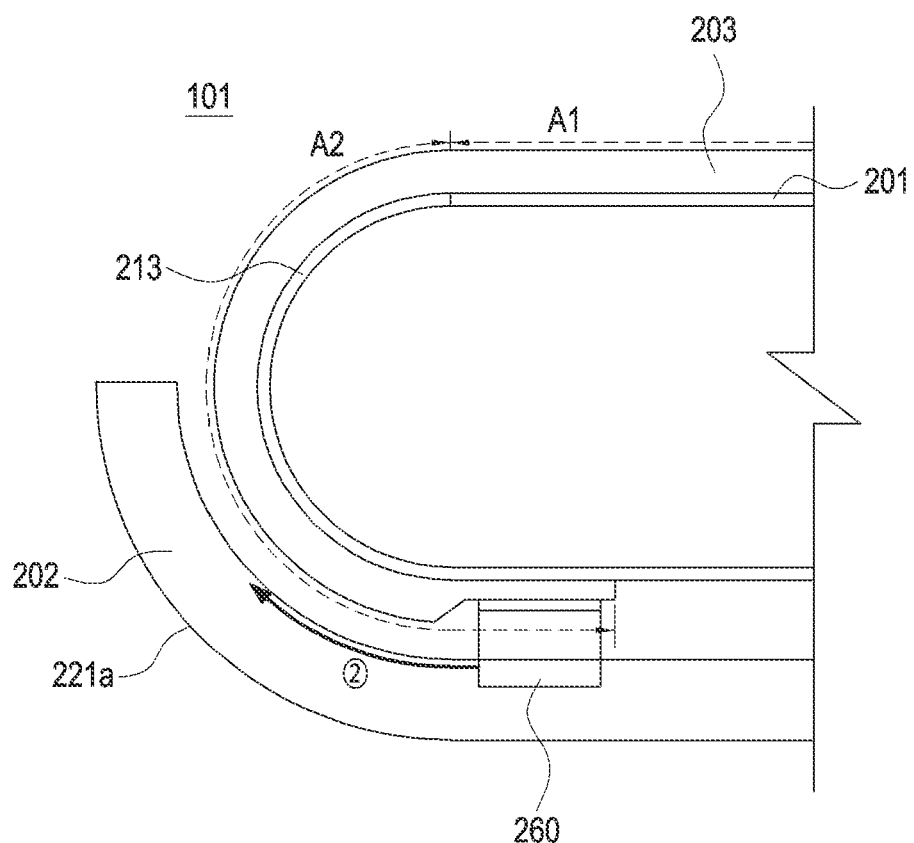
FIG. 6 is a side view illustrating an arrangement relationship between a sweeper and a surrounding structure and a movement path of the sweeper according to various embodiments of the disclosure.

FIG. 5 is a perspective view illustrating an arrangement relationship between a sweeper member 260 (hereinafter, simply "sweeper" 260) and a surrounding structure according to various embodiments of the disclosure. FIG. 6 is a side view illustrating an arrangement relationship between a sweeper 260 and a surrounding structure and a movement path of the sweeper 260 according to various embodiments of the disclosure.

Referring to FIGS. 5 and 6, an electronic device 101 may include a first structure 201, a second structure 202 (e.g., a housing), a flexible display 203 (hereinafter, simply "display" 203), an articulated hinge structure 213, and at least one sweeper 260 formed of a low-density elastic body, such as a sponge, or a brush. Hereinafter, the configuration of the first structure 201, the second structure 202 (e.g., a housing), the display 203, and the articulated hinge structure 213 of FIGS. 5 and 6 may be identical in whole or part to the configuration of the first structure 201, the second structure 202 (e.g., the housing), the display 203, and the articulated hinge structure 213 of FIGS. 2 to 4.

According to various embodiments, the sweeper 260 may include at least three layers. The sweeper 260 may include an adhesive part 261, a support part 262, and a brush part 263. The adhesive part 261, the support part 262, and the brush part 263 may be stacked. For example, the adhesive part 261 may be formed of an adhesive material, such as a double-sided tape, to attach the support part 262 to the second area A2. For example, the support part 262 may support the brush part 263 so that, when the sweeper 260 slides, at least a portion of the brush part 263 may move to tightly contact the inside of the second structure 202. For example, the brush part 263 may be formed of a low-density elastic material, such as a sponge.

According to various embodiments, to prevent an inflow of foreign substances into the electronic device 101, the thickness h of the sweeper 260 may be larger than the interval between the second plate 221a of the second structure 202 and the second areas A2 of the display 203. According to an embodiment, the thickness h of the sweeper 260 may be set 0.25 to 0.3 mm wider than the interval between the second plate 221a of the second structure 202 and the second area A2 of the display 203. For example, the length of the overlapping portion may be 0.25 to 0.3 mm or less. The thickness h of the sweeper 260 may be designed to easily prevent foreign substances d even with the smallest dimension, considering a tolerance of ±0.25 mm for the thickness h of the sweeper 260 upon manufacturing the sweeper 260. However, the configuration and size of the sweeper 260 are not limited to the above-described embodiment, and various design changes may be made thereto depending on the size or arrangement of surrounding structures. According to various embodiments, when the sweeper 260 slides according to the sliding movement of the first structure 201, it may overlap the inner surface of the second plate 221a of the second structure 202, preventing an inflow of foreign substances d.

According to various embodiments, the sweeper 260 may be disposed substantially in the internal space of the second structure 202. For example, the sweeper 260 may be attached to one end of the second area A2 of the display 203 and may slide along the inside of the second structure 202 in response to the sliding movement of the first structure 201. Accordingly, since the sweeper 260 slides together with the first structure 201 and the display 203, the rubbing of the display 203 due to the movement of the sweeper 260 may be avoided, preventing scratches to the display 203 or damage to the coating layer (e.g., anti-finger (AF) coating).

According to various embodiments, when the sweeper 260 is driven, the layer attached to the first structure 201 may be the adhesive part 261, and the layer overlapping the second structure 202 may be the brush part 263. The brush part 263 may be formed of a soft material, and when the sweeper 260 slides, it may move smoothly, thereby preventing malfunction due to an overlap between the sweeper 260 and the second plate 221a.

According to various embodiments, when the first structure 201 moves from the closed state to the open state with respect to the second structure 202, the sweeper 260 may come in contact with the second plate 221a while moving toward an edge of the second plate 221a in the second direction (e.g., direction ②).

According to various embodiments, if the first structure 201 reaches the open state, the sweeper 260 may contact the inner surface of the edge of the second plate 221a. In this case, the sweeper 260 may block the inflow of foreign substances by sealing the gap between the inner surface of the edge of the second plate 221a and the surface of the display 203.

Figure 7:
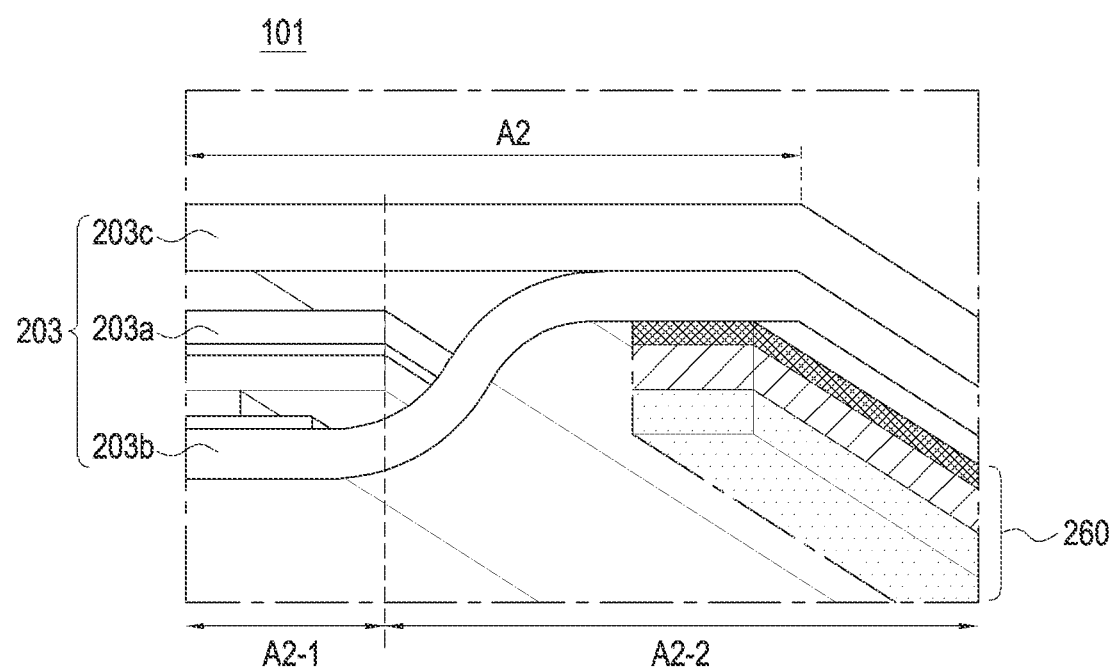
FIG. 7 is an enlarged cross-sectional view illustrating a structure of a display according to an embodiment of the disclosure.

FIG. 7 is an enlarged cross-sectional view illustrating a structure of a flexible display 203 (hereinafter, simply "display" 203) according to one of various embodiments of the disclosure.

Referring to FIG. 7, an electronic device 101 may include a first structure (e.g., the first structure 201 of FIGS. 2 to 6), a second structure 202 (e.g., a housing), a display 203, an articulated hinge structure (e.g., the articulated hinge structure 213 of FIGS. 4 and 5), and at least one sweeper member 260 (hereinafter, simply "sweeper") formed of a low-density elastic body, such as a sponge, or a brush. Hereinafter, the configuration of the first structure (e.g., the first structure 201 of FIGS. 2 to 6), the second structure 202 (e.g., the housing), the display 203, and the articulated hinge structure 213 of FIG. 7 may be identical in whole or part to the configuration of the first structure 201, the second structure 202 (e.g., the housing), the display 203, and the articulated hinge structure 213 of FIGS. 5 and 6.

According to various embodiments, a second area A2 of the display 203 may include a 2-1th area A2-1 extending from a first area A1 and a 2-2th area A2-2 extending from the 2-1th area A2-1. However, the segmentation of the display 203 as shown in FIG. 7 is merely an example, and the display 203 may be divided into a plurality of (e.g., four or more, or two) areas depending on the structure or function of the display 203.

According to various embodiments, the display 203 may include a plurality of layers. For example, in the display 203, a display panel layer 203a, a protection layer 203b, and a metal layer 203c may be sequentially stacked. The protection layer 203b may cover the display panel 203a from external impact and/or foreign substances so that the display panel 203a is not damaged. The protection layer 203b may extend along one surface or a side surface of the display panel 203a and may seal the display panel 203a.

According to an embodiment, the 2-1th area A2-1 may be composed of layers including the display panel layer 203a and the protection layer 203b, and the 2-2th area A2-2 may be composed of layers other than the display panel layer 203a. For example, the 2-2th area A2-2 may include the protection layer 203b or the metal layer 203c which is not related to damage to the display panel, except for the display panel layer 203a. The protection layer 203b of the 2-2th area A2-2 may be formed to surround the side surface of the display panel layer 203a of the 2-1th area A2-1, protecting the display panel 203a from external impact and/or foreign substances.

According to various embodiments, the sweeper 260 may be attached to one end of the 2-2th area A2-2 of the display 203. When the sweeper 260 is attached to the display 203, a pressing process may be required to secure the adhesive strength, and damage to the display may be induced by the pressure caused by the pressing process. In this case, when the layers other than the display panel layer 203a are damaged, the use of the electronic device 101 is not affected, but when the display panel layer 203a is damaged, the use of the electronic device 101 may be affected. Accordingly, as the sweeper 260 is attached to one end of the 2-2th area A2-2, the display panel layer 203a may be prevented from damage due to the attachment and driving of the sweeper 260.

Figure 8:
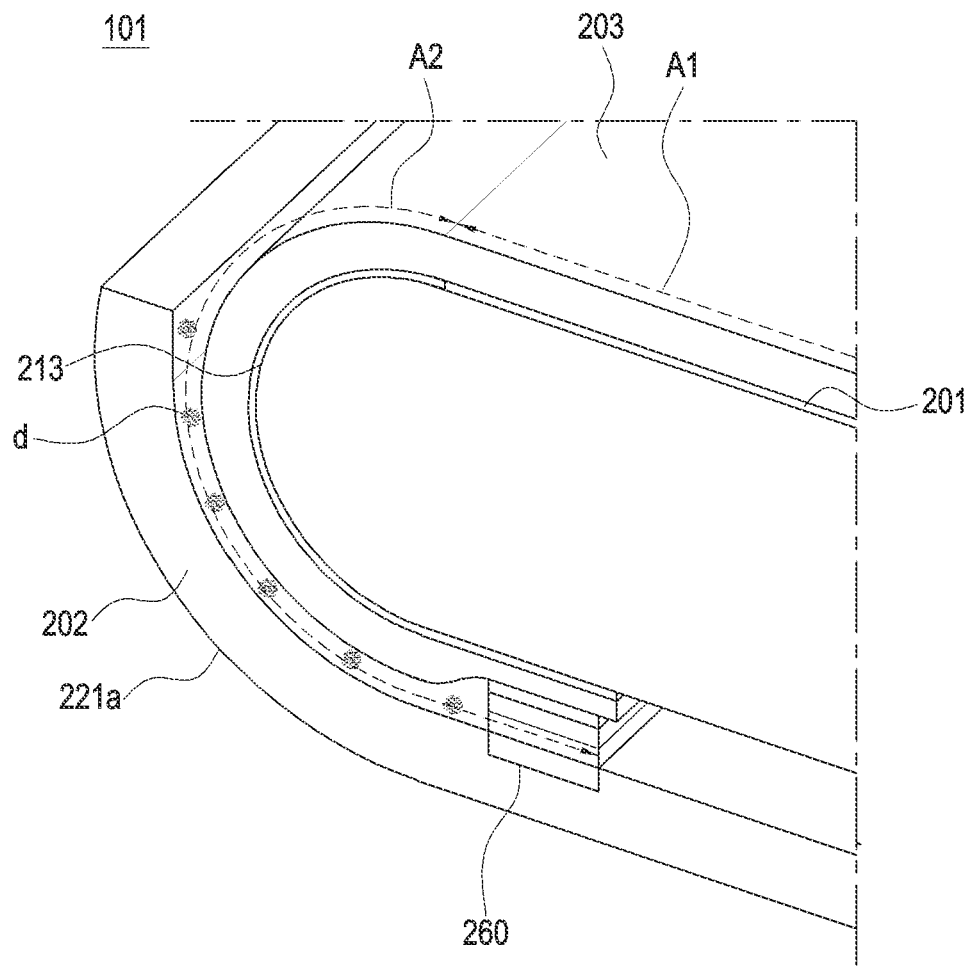
FIG. 8 is a view illustrating a path along which foreign substances are introduced into the inside according to various embodiments of the disclosure.
Figure 9:
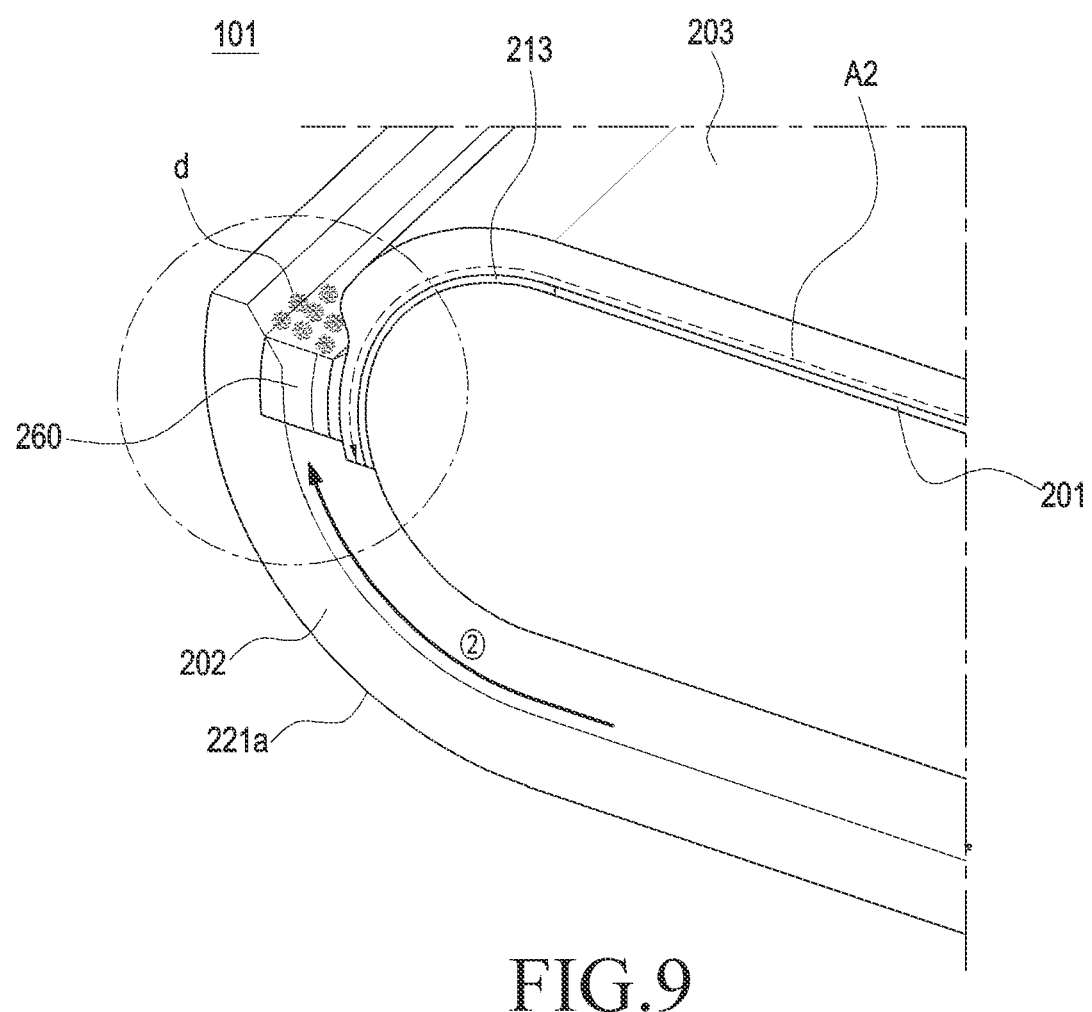
FIG. 9 is a view illustrating an operation for discharging foreign substances introduced into the inside to the outside through a sweeper, according to various embodiments of the disclosure.

FIG. 8 is a view illustrating a path along which foreign substances d are introduced into the inside according to various embodiments of the disclosure. FIG. 9 is a view illustrating an operation in which foreign substances d introduced into the inside are discharged to the outside through a sweeper member 260 (hereinafter, simply "sweeper" 260) according to various embodiments of the disclosure.

Referring to FIGS. 8 and 9, an electronic device 101 may include a first structure 201, a second structure 202 (e.g., a housing), a flexible display 203 (hereinafter, simply "display" 203), an articulated hinge structure 213, and a sweeper 260. Hereinafter, the configuration of the first structure 201, the second structure 202 (e.g., a housing), the display 203, and the articulated hinge structure 213 of FIGS. 8 and 9 may be identical in whole or part to the configuration of the first structure 201, the second structure 202 (e.g., the housing), the display 203, and the articulated hinge structure 213 of FIG. 7.

According to various embodiments, foreign substances d may be introduced through the gap between the second plate 221a of the second structure 202 and the second area A2 of the display 203. However, due to the sweeper 260 having a thickness h larger than the interval between the second plate 221a of the second structure 202 and the second area A2 of the display 203, the foreign substances d may be prevented from entry.

According to various embodiments, foreign substances d may be introduced through the gap between the second plate 221a of the second structure 202 and the second area A2 of the display 203. In this case, the sweeper 260 that slides together with the first structure 201 sliding from the closed state to the open state may sweep the foreign substances d in the second direction (e.g., direction ②), discharging the foreign substances d to the outside.

Figure 10:
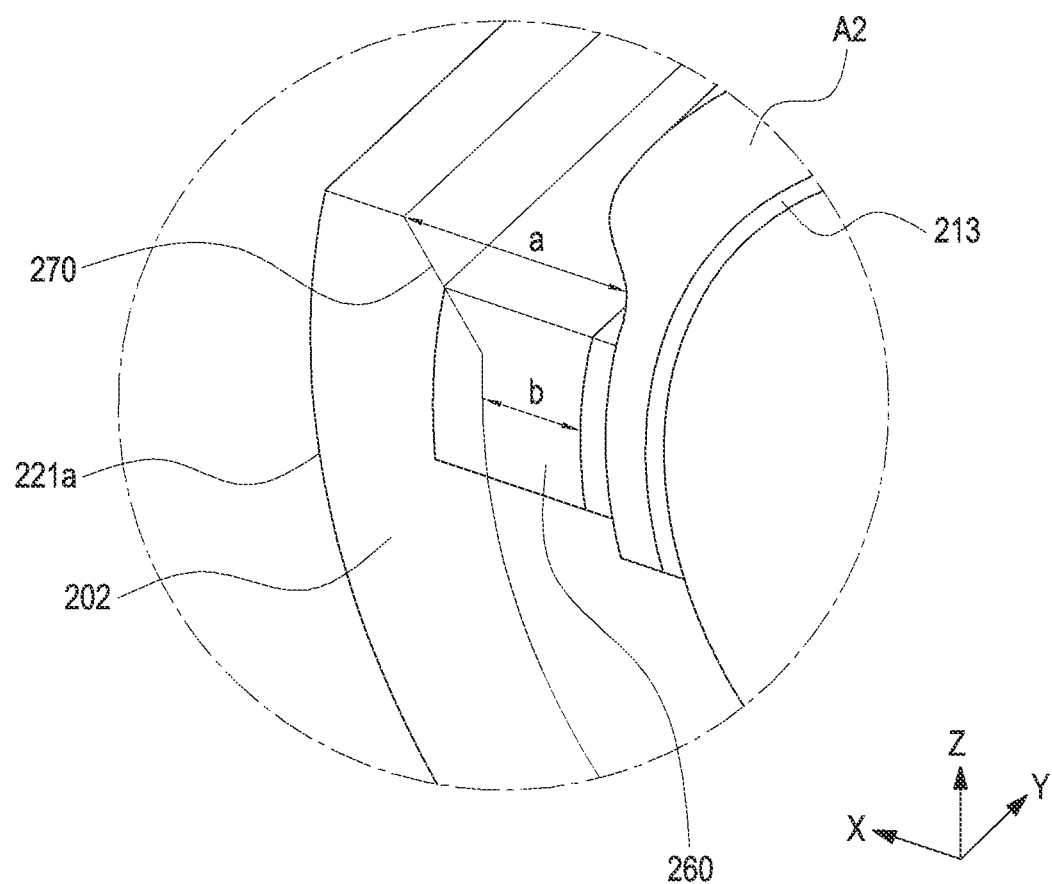
FIG. 10 is a view illustrating a configuration of a chamfer according to one of various embodiments of the disclosure.

FIG. 10 is a view illustrating a configuration of a chamfer 270 according to one of various embodiments of the disclosure.

Referring to FIG. 10, an electronic device 101 may include a first structure 201, a second structure 202 (e.g., a housing), a flexible display 203 (hereinafter, simply "display" 203), an articulated hinge structure 213, a sweeper member 260 (hereinafter, simply "sweeper" 260), and a chamfer 270 formed at a designated angle θ. Hereinafter, the configuration of the first structure 201, the second structure 202 (e.g., the housing), the display 203, the articulated hinge structure 213, and the sweeper 260 of FIG. 10 may be identical in whole or part to the configuration of the first structure 201, the second structure 202 (e.g., the housing), the display 203, the articulated hinge structure 213, and the sweeper 260 of FIGS. 8 and 9.

According to various embodiments, when the chamfer 270 is formed at an end of the second plate 221a of the second structure 202, it may help to discharge the foreign substances d. According to an embodiment, at least a portion of the second plate 221a may form the chamfer 270. According to another embodiment, the second structure 202 may further include the second plate 221a and the chamfer 270 extending from one end of the second plate 221a.

According to various embodiments, the chamfer 270 may be formed at an end of the second structure 202 that is bent upward along the shape of the articulated hinge structure 213 connected with one end of the first structure 201. For example, the position where the chamfer 270 is formed may be a portion where the sweeper 260 contacts the second plate 221a of the second structure 202 when the first structure 201 is in the open state.

According to various embodiments, the direction of the sliding movement of the display 203 may be defined as an x-axis direction. Further, a direction perpendicular to the x-axis direction may be defined as a y-axis direction. The chamfer 270 may be formed by cutting a corner portion connecting the upper surface (xy plane) and the inner surface of the end of the second structure 202 at a designated angle θ and extending it in the y-axis direction. The designated angle θ may be larger than or equal to 0° and less than 90°. For example, the designated angle θ may be about 45°.

According to various embodiments, in the open state of the first structure 201, a second gap ⓐ between one surface of the chamfer 270 and the display 203 may be wider than a first gap ⓑ between the second plate 221a of the second structure 202 and the display 203. Accordingly, when the first structure 201 slides from the closed state to the open state, the gap of the portion in contact with the sweeper 260 in the open state is widened, allowing the foreign substances d to be easily discharged.

Figure 11:
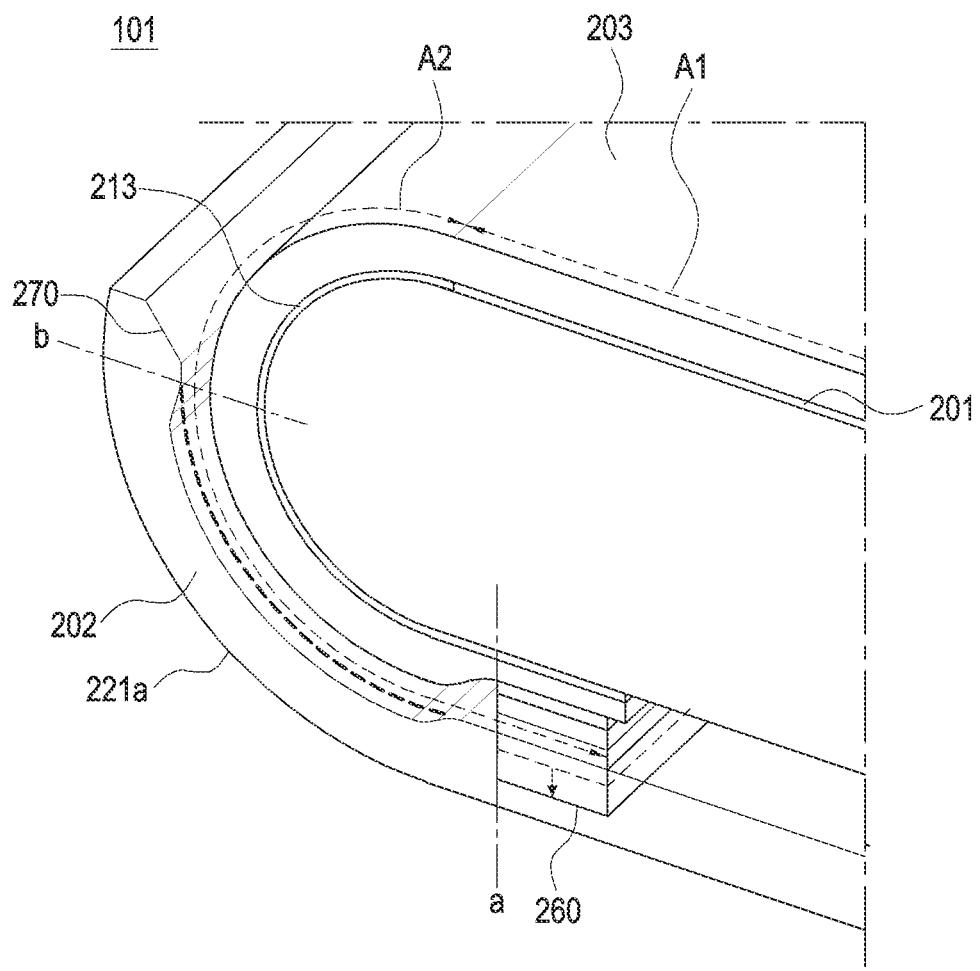
FIG. 11 is a view illustrating a form in which processing has been performed to widen a gap between a second plate of a second structure and a 2-2th area of a display according to an embodiment of the disclosure.

FIG. 11 is a view illustrating a form in which processing has been performed to widen a gap between a second plate 221a of a second structure 202 and a second area A2 of a flexible display 203 (hereinafter, simply "display" 203) according to one of various embodiments of the disclosure.

Referring to FIG. 11, an electronic device 101 may include a first structure 201, a second structure 202 (e.g., a housing), a display 203, an articulated hinge structure 213, a sweeper member 260 (hereinafter, simply "sweeper" 260), and a chamfer 270. Hereinafter, the configuration of the first structure 201, the second structure 202 (e.g., the housing), the display 203, the articulated hinge structure 213, the sweeper 260, and the chamfer 270 of FIG. 11 may be identical in whole or part to the configuration of the first structure 201, the second structure 202 (e.g., the housing), the display 203, the articulated hinge structure 213, the sweeper 260, and the chamfer 270 of FIG. 10.

According to various embodiments, in the closed state of the first structure 201, the foreign substances d may not enter from the position (e.g., the 2-2th area A2-2) where the sweeper 260 is attached to the inside of the electronic device due to the sweeper 260. However, up to the portion where the sweeper 260 is attached, the foreign substances d may be introduced through the passage between the second plate 221a of the second structure 202 and the second area A2 of the display 203. In this case, the inner surface of the second structure 202 may be recessed downward to prevent the risk of damage to the display 203 due to the introduced foreign substances d. According to various embodiments, a recessed surface, such as a dent, may be defined as a recess. According to an embodiment, it is possible to widen the gap between the second plate 221a of the second structure 202 and the 2-2th area A2-2 of the display 203 by cutting the inner surface of the second plate 221a of the second structure 202. For example, the inner surface of the second structure 202 may be recessed downward as compared with the end of the second structure 202 which is bent upward along the shape of the articulated hinge structure 213 connected with one end of the first structure 201, i.e., the inlet where the foreign substances d are introduced. For example, the inner surface of the second plate 221a of the second structure 202 may be recessed by about 0.1 mm.

According to various embodiments, the section where the inner surface of the second plate 221a is cut may be a section from the portion a in contact with the sweeper 206 when the first structure 201 is in the closed state to the portion b in contact with the sweeper 206 when the first structure 201 is in the open state.

According to various embodiments, cutting the inner surface of the second plate 221a of the second structure 202 may be defined as slimming. In the process of slimming, the overlapping thickness between the sweeper 260 and the second structure 202 may be decreased, thereby reducing the effect of preventing foreign substances. To prevent this, the thickness of the brush part 263 of the sweeper 260 may be extended. According to various embodiments, the thickness of the brush part 263 of the sweeper 260 may be extended, corresponding to the thickness of the recessed portion of the second structure 202. In an embodiment, the thickness of the brush part 263 of the sweeper 260 may be increased by 0.1 mm, corresponding to the dimensions of cutting the inner surface of the second plate 221a of the second structure 202. Thus, even while the sweeper 260 passes the slimming area, the overlapping thickness between the sweeper 260 and the second structure 202 may remain constant, thus preventing an inflow of foreign substances d due to the overlap and damage to the display 203 due to the foreign substances d introduced into the inside.

According to various embodiments of the disclosure, an electronic device (e.g., the electronic device 101 of FIGS. 1 to 4) may comprise a first structure (e.g., the first structure 201 of FIGS. 2 to 6), a second structure (e.g., the second structure 202 of FIGS. 2 to 6) receiving at least a portion of the first structure 201 and guiding a sliding movement of the first structure 201, a flexible display (e.g., the flexible display 203 of FIGS. 2 to 6) including a first area A1 connected with the first structure 201 and a second area A2 extending from the first area A1 and bendable, and a sweeper member 260 formed to slide along an inside of the second structure 202 while being attached to an end of the second area A2 of the flexible display 203, corresponding to the sliding movement of the flexible display 203.

According to various embodiments, the sweeper member 260 may include a brush part 263, a support part 262 for supporting the brush part, and an adhesive part 261 for attaching the support part 262 onto the second area A2.

According to various embodiments, the brush part 263 may include a low-density elastic material.

According to various embodiments, the sweeper member 260 may be positioned between the flexible display 203 and the second structure 202. A thickness of the sweeper member 260 may be larger than an interval between the flexible display 203 and the second structure 202.

According to various embodiments, the sweeper member 260 may overlap an inner surface of the second structure 202 to prevent an inflow of a foreign substance d.

According to various embodiments, a length of the overlapping portion may be 0.1 mm or more and 0.45 mm or less, reflecting dimensional tolerances of the sweeper and the structure.

According to various embodiments, the overlapping portion may be a brush part 263 of the sweeper member 260.

According to various embodiments, the sweeper member 260 may slide to sweep out a foreign substance d introduced through a gap between the flexible display 203 and the second structure 202.

According to various embodiments, the sweeper member 260 may contact an inner surface of an edge of the second structure 202 to block an inflow of an external foreign substance d, in an open state of the first structure 201 with respect to the second structure 202.

According to various embodiments, an inner surface of the second structure 202 may be recessed downward as compared with an inlet portion which is an end of the second structure 202 bent upward along a shape of the articulated hinge structure 213.

According to various embodiments, a recessed section of the second structure 202 may be from a portion in contact with the sweeper member 260 in a closed state of the first structure 201 with respect to the second structure 202 to a portion in contact with the sweeper member 260 in an open state of the first structure 201 with respect to the second structure 202.

According to various embodiments, a thickness of a brush part 263 of the sweeper 260 may be extended corresponding to a thickness of the recessed portion of the second structure 202.

According to various embodiments, the thickness of the recessed portion of the second structure 202 and the thickness of the extension of the brush part 263 of the sweeper member 260 may be 0.1 mm.

According to various embodiments, the electronic device may further comprise a chamfer 270 formed at an end of the second structure 202 to easily discharge a foreign substance d according to the sliding movement of the sweeper member 260.

According to various embodiments, the chamfer 270 may be formed in a corner portion connecting an inner surface and an upper surface of an end bent upward along a shape of an articulated hinge structure 213 in the second structure 202.

According to various embodiments, the chamfer 270 may be formed at a designated angle θ with respect to an end of the second structure 202 and may be formed to extend in a direction perpendicular to a direction of the sliding movement of the flexible display 203.

According to various embodiments, an interval between one surface of the chamfer 270 and the flexible display 203 may be larger than an interval between an inner surface of the second structure 202 and the flexible display 203.

According to various embodiments, an electronic device 101 may comprise a first structure (e.g., the first structure 201 of FIGS. 2 to 6), a second structure (e.g., the second structure 202 of FIGS. 2 to 6) receiving at least a portion of the first structure 201 and guiding a sliding movement of the first structure 201, a flexible display 203 including a first area A1 connected with the first structure 201 and a second area A2 extending from the first area A1 and bendable, the second area A2 including a 2-1th area A2-1 extending from the first area A1 and in which a display panel and a protection layer are stacked, and a 2-2th area A2-2 extending from the 2-1th area and in which the protection layer is positioned and the display panel is excluded, and a sweeper member 260 attached onto the 2-2th area A2-2 of the flexible display 203.

According to various embodiments, a thickness of the 2-1th area A2-1 may be larger than a thickness of the 2-2th area A2-2.

According to various embodiments, the electronic device 101 may further comprise a battery.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
   a first structure;
   a second structure receiving at least a portion of the first structure and guiding a sliding movement of the first structure;
   a flexible display including a first area connected with the first structure and a second area extending from the first area and bendable; and
   a sweeper member formed to slide along an inside of the second structure while being attached to an end of the second area of the flexible display, corresponding to the sliding movement of the flexible display.

2. The electronic device of claim 1, wherein the sweeper member includes:
   a brush part;
   a support part for supporting the brush part; and
   an adhesive part for attaching the support part onto the second area.

3. The electronic device of claim 2, wherein the brush part includes a low-density elastic material.

4. The electronic device of claim 1,
   wherein the sweeper member is positioned between the flexible display and the second structure, and
   wherein a thickness of the sweeper member is larger than an interval between the flexible display and the second structure.

5. The electronic device of claim 4, wherein the sweeper member overlaps an inner surface of the second structure to prevent an inflow of a foreign substance.

6. The electronic device of claim 5, wherein a length of the overlapping portion of the sweeper member is in the range of 0.1 mm to 0.45 mm.

7. The electronic device of claim 5, wherein the overlapping portion of the sweeper member is a brush part of the sweeper member.

8. The electronic device of claim 1, wherein the sweeper member is configured to slide to sweep out a foreign substance introduced through a gap between the flexible display and the second structure.

9. The electronic device of claim 1, wherein the sweeper member is configured to contact an inner surface of an edge of the second structure to block an inflow of an external foreign substance, in an open state of the first structure with respect to the second structure.

10. The electronic device of claim 2, further comprising:
    an articulated hinge structure connected to an end of the first structure,
    wherein an inner surface of the second structure is recessed downward as compared with an inlet portion which is an end of the second structure bent upward along a shape of the articulated hinge structure.

11. The electronic device of claim 10, wherein a recessed section of the second structure is from a portion in contact with the sweeper in a closed state of the first structure with respect to the second structure to a portion in contact with the sweeper in an open state of the first structure with respect to the second structure.

12. The electronic device of claim 10, wherein a thickness of the brush part of the sweeper is extended corresponding to a thickness of the recessed section of the second structure.

13. The electronic device of claim 12,
    wherein the thickness of the recessed section of the second structure, and
    wherein the thickness of the extension of the brush part of the sweeper is 0.1 mm.

14. The electronic device of claim 1, further comprising a chamfer formed at an end of the second structure to easily discharge a foreign substance according to the sliding movement of the sweeper.

15. The electronic device of claim 14, wherein the chamfer is formed in a corner portion of the second structure connecting an inner surface and an upper surface of an end of the second structure bent upward along a shape of an articulated hinge structure.

16. The electronic device of claim 14,
wherein the chamfer is formed at a designated angle with respect to an end of the second structure, and
wherein the chamfer is formed to extend in a direction perpendicular to a direction of the sliding movement of the flexible display.

17. The electronic device of claim 14, wherein an interval between one surface of the chamfer and the flexible display is larger than an interval between an inner surface of the second structure and the flexible display.

18. The electronic device of claim 1, wherein
the second area comprises:
a 2-1th area extending from the first area and in which a display panel and a protection layer are stacked; and
a 2-2th area extending from the 2-1th area and in which the protection layer is positioned and the display panel is excluded, and
wherein the sweeper member is attached onto the 2-2th area of the flexible display.

19. The electronic device of claim 18, wherein a thickness of the 2-1th area is larger than a thickness of the 2-2th area.

20. The electronic device of claim 1, further comprising a battery.

* * * * *